United States Patent [19]
Morishita

[11] Patent Number: 5,649,876
[45] Date of Patent: Jul. 22, 1997

[54] PULLEY THRUST PRESSURE CONTROL APPARATUS FOR BELT-TYPE CONTINUOUSLY VARIABLE TRANSMISSION

[75] Inventor: Naohisa Morishita, Fujimi, Japan

[73] Assignee: Honda Giken Kogyo Kabushiki Kaisha, Tokyo, Japan

[21] Appl. No.: 592,117

[22] Filed: Jan. 26, 1996

[30] Foreign Application Priority Data

Jan. 26, 1995 [JP] Japan ................... 7-029950

[51] Int. Cl.$^6$ .......................... F16H 59/00
[52] U.S. Cl. .................. 474/28; 474/18; 475/45
[58] Field of Search ............... 477/45, 46, 47, 477/48, 49; 474/18, 28, 110, 104

[56] References Cited

U.S. PATENT DOCUMENTS

| | | | |
|---|---|---|---|
| 4,674,363 | 6/1987 | Miyawaki | 477/49 |
| 4,751,857 | 6/1988 | Sakai | 477/49 |
| 4,761,153 | 8/1988 | Morimoto | 474/28 |
| 4,772,249 | 9/1988 | Kouno et al. | 474/28 |
| 4,781,655 | 11/1988 | Tezuka | 474/28 |
| 4,967,621 | 11/1990 | Soga et al. | 477/45 X |
| 5,108,348 | 4/1992 | Bornmann | 474/18 |
| 5,144,864 | 9/1992 | Sawasaki et al. | 477/45 X |
| 5,183,439 | 2/1993 | Yumoto et al. | 474/28 |
| 5,203,233 | 4/1993 | Hattori et al. | 477/45 |
| 5,427,579 | 6/1995 | Kanehara et al. | 474/28 |

FOREIGN PATENT DOCUMENTS 62-196448  8/1987  Japan.

Primary Examiner—Charles A. Marmor
Assistant Examiner—Peter T. Kwon
Attorney, Agent, or Firm—Lyon & Lyon LLP

[57] ABSTRACT

A pulley thrust pressure control apparatus for a belt-type continuously variable transmission comprises a pulley thrust pressure valve unit 40 for setting a low pulley thrust control pressure and a high pulley thrust control pressure greater than the low pulley thrust control pressure; a shift valve 53 for supplying the low and high pulley thrust control pressures selectively into drive and driven cylinders 14 and 19 of drive and driven pulleys in correspondence with the position of a spool thereof; a drive pressure feedback passage 39c for causing the pressure inside the drive cylinder 14 to act on the spool as a positional control force; and a driven pressure feedback passage 39d for causing the pressure inside the driven cylinder 19 to act as a positional control force on the spool in the direction opposite of that cause by the pressure from the drive pressure feedback passage. When control of the pulley thrust pressures is carried out by this apparatus, a minimum pressure required for the drive and driven cylinders is insured without increasing the load on the pump which supplies hydraulic oil into the drive and driven cylinders. In addition, control of the speed ratio of the transmission is performed steadily with little change in the pressure.

17 Claims, 8 Drawing Sheets

PULLEY THRUST PRESSURE CONTROL APPARATUS FOR BELT-TYPE CONTINUOUSLY VARIABLE TRANSMISSION

FIELD OF THE INVENTION

The present invention relates generally to a belt-type continuously variable transmission, which is often incorporated in automobiles and other vehicles, and particularly to a control apparatus for controlling a thrust control pressure which produces a thrust to adjust the variable width of the pulley engaging the transmission belt.

BACKGROUND OF THE INVENTION

Belt-type continuously variable transmissions have been well-known and put into practical use in automobiles and other vehicles. Such belt-type continuously variable transmission comprises, for example, drive and driven pulleys each having a variable pulley width, and a metallic V-belt trained therearound. The speed ratio of the transmission is controlled by controlling the adjustment of the pulley widths of the drive and driven pulleys. For the controlled adjustment of the pulley widths, the axially movable member of the halves comprising each pulley is provided with a hydraulic cylinder, into which a pulley thrust control pressure is supplied. Control of the pulley thrust pressures into the respective cylinders of the drive and driven pulleys allows varying the pitch diameters of the pulleys, around which the V-belt runs, and thereby controls the speed ratio of the transmission.

As a means for controlling the supply of pulley thrust pressures into the respective cylinders, a shift valve (four-way valve) is provided, and through the shift valve, high and low pulley thrust control pressures PL and PH are supplied to the drive and driven pulleys, respectively or vise versa. The low pulley thrust control pressure PL is the lowest possible pressure which allows torque transmission without any slippage between the pulleys and the belt, and the high pulley thrust control pressure PH is a pressure which works to control the speed ratio of the transmission and is greater than the low pulley thrust control pressure PL.

FIG. 9 shows one such Prior art shift valve. This shift valve 153 comprises a high pulley thrust pressure port 153b to receive the high pulley thrust control pressure PH; low pulley thrust pressure ports 153c provided on both sides of the high pulley thrust pressure port 153b to receive the low pulley thrust control pressure PL; a drive port 153d connected to the cylinder of the drive pulley (hereinafter referred to as "drive cylinder") of a continuously variable transmission; a driven port 153e connected to the cylinder of the driven pulley (hereinafter referred to as "driven cylinder"); and a spool 153a, whose position is controllable from a neutral position either to the right or to the left. When the spool 153a is controlled positionally, the land portions thereof function to interconnect or block the ports. The right end of the spool 153a is pushed by a spring or a hydraulic pressure, and the left end is pushed by a shift control pressure $P_{SV}$ provided by, for example, a current-controlled solenoid valve, balancing the biasing force of the spring so as to control the position of the spool 153a.

As shown in FIG. 9, when the spool 153a of this shift valve 153 is at a neutral position, the low pulley thrust pressure ports 153c are connected to the drive and driven ports 153d and 153e respectively through the openings present due to underlap (L1–L2) of the land portions of the spool 153a and the drive and driven ports 153d and 153e. Therefore, the low pulley thrust control pressure PL is supplied sufficiently into both drive and driven cylinders. As a result, the pulley thrust pressures of the drive and driven pulleys are retained at the low pulley thrust control pressure PL, which is a pressure necessary to avoid slippage of the belt, while the speed ratio is not being controlled to change.

When the spool 153a is shifted either to the right or to the left from the neutral position, the low and high pulley thrust control pressures PL and PH are supplied selectively into the respective cylinders, each pressure with a flow proportional to the cross-sectional area of the interconnection of respective ports. As a result, changes of the pitch diameters of the pulleys, which brings a change in the speed ratio of the transmission, are effected. FIG. 10 shows the pressures inside the drive and driven cylinders with respect to the position of the spool 153a.

However, the shift valve 153, with the above described construction, presents a problem that the pressure inside one of the cylinders can decrease to a pressure below the low pulley thrust control pressure PL (refer to the portions indicated by "A" in FIG. 10). The reason is that, at one of the ports, the opening from the above mentioned underlap substantially disappears when the spool 153a is shifted a little either to the right or to the left, creating reductions in the flows from both high and low pulley thrust pressure ports 153b and 153c to one of the drive and driven ports 153d and 153e whose opening is narrowing. When this happens, the belt of the transmission slips over the pulley whose pressure has decreased, and torque transmission is impaired.

In order to prevent such pressure drop, the underlap between the land portions and the drive and driven ports may be made larger. However, if the shift valve were constructed as such, part of the high pulley thrust control pressure PH flowing into the shift valve from the high pulley thrust pressure port 153b would flow into the low pulley thrust pressure port 153c, as shown in FIG. 11, thereby increasing the load of the oil pump, which works as pressure source for producing each control pressure. The result would be a new problem. Furthermore, such construction would present another problem of reduced controllability for the variable transmission. The reason is that such construction would widen the insensitive range or dead zone (refer to FIG. 10), where the pressure in each cylinder is not changed while the spool 153a is being shifted.

It is also possible to set each control pressure a little higher so as to keep the belt running without slippage even when the pressure inside one of the cylinders decreases to a pressure a little below the low pulley thrust control pressure PL. However, this would be no different from the above mentioned underlap increase with respect to presenting a problem of increased load for the oil pump.

Furthermore, the speed ratio, i.e., ratio of the pitch diameters of the pulleys, of a belt-type continuously variable transmission is prone to be affected by changes in the torque transmitted by the belt. In order to perform a steady control of the speed ratio, it is necessary to carry out positional control of the spool, i.e., control of the control pressures, accurately in consideration of the relationship between transmission torque and pressure-to-flow rate characteristics, and to carry out feedback control of the speed ratio. All of these contribute to complicate and burden the control operation involved with the shift valve of the prior art.

In Japanese Patent Laid-open Publication No. 62-196448, an apparatus is proposed which supplements a low pulley thrust control pressure when the pressure inside one of the cylinders decreases below the desired low pulley thrust control pressure. The low pulley thrust control pressure is supplemented directly into the cylinder whose pressure has decreased, without making it flow through the shift valve. However, this apparatus presents a problem that a constant pressure cannot be applied continuously in each cylinder unless control of the spool in the shift valve, i.e., control of the thrust of the solenoid pushing the spool, is performed with substantially high precision.

SUMMARY OF THE INVENTION

It is an object of the present invention to provide a pulley thrust pressure control apparatus which is capable of performing smooth supply control of pulley thrust pressures to the drive and driven pulleys of a belt-type continuously variable transmission.

It is another object of the present invention to provide a pulley thrust pressure control apparatus which carries out supply control of pulley thrust control pressures to the drive and driven pulleys through a shift valve while preventing both pressures of the drive and driven pulleys from decreasing to a pressure less than the low pulley thrust control pressure required to avoid slippage of the belt.

In order to achieve these objects, the present invention embodies a pulley thrust pressure control apparatus comprising a thrust pressure setting means for setting a low pulley thrust control pressure and a high pulley thrust control pressure greater than the low pulley thrust control pressure; a shift valve supplying the low and high pulley thrust control pressures selectively into the drive and driven cylinders in correspondence with the position of the spool of the shift valve; a positional control biasing means for providing the spool with a first positional control force for the purpose of controlling the position of the spool; a drive pressure feedback passage for causing the pressure inside the drive cylinder to act on the spool as a second positional control force; and a driven pressure feedback passage for causing the pressure inside the driven cylinder to act as a third positional control force on the spool in the opposite direction of that caused by the second positional force, i.e., the pressure on the spool from the drive pressure feedback passage. It is preferable that the second positional control force act in the direction to which the spool should shift so as to supply the low pulley thrust control pressure into the drive cylinder and the high pulley thrust control pressure into the driven cylinder, and that the third positional control force act in the direction to which the spool should shift so as to supply the low pulley thrust control pressure into the driven cylinder and the high pulley thrust control pressure into the drive cylinder, respectively.

In this apparatus, the spool of the shift valve is positionally controlled by the balance of the first, second and third positional control forces, i.e., the control pressures acting on the spool. While the spool is in the vicinity of the neutral position, if the pressure in the drive cylinder or driven cylinder decreases to below the low pulley thrust control pressure, then the spool shifts to a position where the second or third positional control force generated by the pressure being reduced and the other positional control forces balance with one another. If the apparatus is designed to utilize this shift of the spool to initiate supply of the high pulley thrust control pressure into the cylinder experiencing a pressure drop to below the low pulley thrust control pressure, then the pressure of the cylinder whose pressure has been reduced can be restored to a pressure equal to or above the low pulley thrust pressure.

In this way, it is insured that the pressure in each cylinder is kept at least at the low pulley thrust control pressure. Therefore, it is not necessary to make the underlap between the land portions of the spool and the drive and driven ports large. As a result, it is possible to prevent a pressure leak inside the shift valve from the high pulley thrust pressure port into the low pulley thrust pressure port, and the above mentioned insensitive range of the shift valve can be narrowed. As the pulley thrust pressure for each pulley is insured by the low pulley thrust control pressure, it is not necessary to set each control pressure a little higher as precaution as mentioned above. As a result, power loss is reduced in the output of the oil pump.

Furthermore, because of the provision of the above mentioned feedback passages, even if the first positional control force is kept constant, when the pressure inside each cylinder changes, the spool shifts by itself in correspondence with this pressure change so as to correct the change without control of the control pressures. Therefore, control of the control pressures is simple in this apparatus. Without improving the precision of positional control of the spool, each cylinder can be continually supplied with a constant pressure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
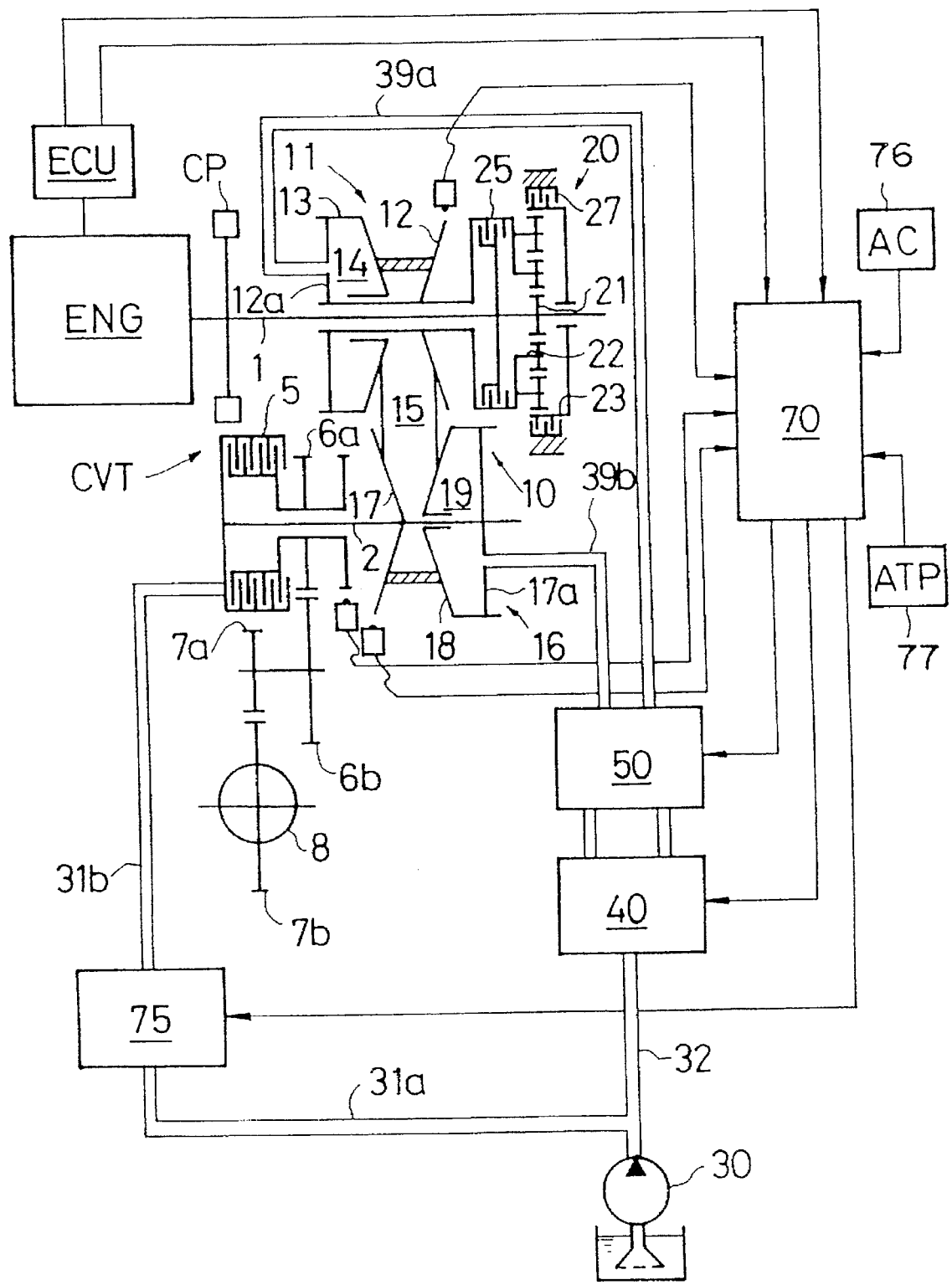
FIG. 1 is a schematic view showing the construction of a V-belt-type continuously variable transmission having a pulley thrust pressure control apparatus of the present invention.

A belt-type continuously variable transmission CVT having a control apparatus according to the present invention is schematically shown in FIG. 1. This belt-type continuously variable transmission CVT comprises a metallic V-belt mechanism 10 disposed between an input shaft 1 and a countershaft 2, a planetary-gear forward-reverse selector mechanism 20 disposed between the input shaft 1 and the drive pulley 11 of the metallic V-belt mechanism 10, and a starting clutch 5 disposed between the countershaft 2 and a differential mechanism 8 as the output member. The transmission CVT is suitable for use as a motor vehicle transmission. The input shaft 1 is connected with the output shaft of an engine ENG through a coupling mechanism CP. The power transmitted to the differential mechanism 8 drives the right and left wheels (not shown).

The metallic V-belt mechanism 10 comprises a drive pulley 11 mounted on the input shaft 1, the driven pulley 16 mounted on the countershaft 2, and a metallic V-belt 15 trained around the drive and driven pulleys 11 and 16.

The drive pulley 11 comprises an axially fixed pulley member 12 rotatably mounted on the input shaft 1, and a movable pulley member 13 axially slidable with respect to the fixed pulley member 12. The movable pulley member 13 has a cylinder chamber 14 defined axially laterally therein by a cylinder wall 12a coupled to the axially fixed pulley member 12. A hydraulic pressure (a pulley thrust pressure) supplied into the cylinder chamber 14 through a hydraulic passage 39a generates a lateral thrust force for sliding the movable pulley member 13 axially toward the fixed pulley member 12.

The driven pulley 16 comprises a fixed pulley member 17 fixedly mounted on the countershaft 2, and a movable pulley member 18 axially slidable with respect to the fixed pulley member 17. The movable pulley member 18 has a cylinder chamber 19 defined axially laterally therein by a cylinder wall 17a coupled to the fixed pulley member 17. A hydraulic pressure (a pulley thrust pressure) supplied into the cylinder chamber 19 through a hydraulic passage 39b generates a lateral thrust force for sliding the movable pulley member 18 axially toward the fixed pulley member 17.

Supply control of the hydraulic pressures (the pulley thrust pressures) into the cylinder chambers 14 and 19 makes possible the control of the thrust forces for adjusting the widths of the pulleys 11 and 16 while avoiding slippage of the V-belt 15. The controllably adjustable widths, controlling the pitch diameters of the pulleys 11 and 16, allows for the mechanism 10 to continuously vary the speed ratio of the transmission.

The planetary-gear forward-reverse selector mechanism 20 comprises a sun gear 21 coaxially coupled to the input shaft 1, a carrier 22 coupled to the axially fixed pulley member 12, a ring gear 23 that can be held against rotation by a reverse brake (a hydraulic actuator for reversing the drive) 27, and a forward clutch 25 capable of holding the sun gear 21 and the ring gear 23 together in rotation. When the forward clutch 25 is engaged, the sun gear 21, the planet gears on the carrier 22, and the ring gear 23 rotate in unison with the input shaft 1. As a result, the drive pulley 11 rotates in the same direction, i.e., forward direction, as the input shaft 1, thereby establishing the power transmission for forward drive. When the reverse brake 27 is engaged, the ring gear 23 is held against rotation. As a result, the carrier 22 is rotated in the direction opposite to that of the sun gear 21, and the drive pulley 11 coupled with the carrier 22 rotates in the direction opposite to that of the input shaft 1, i.e., reverse direction, thereby establishing the power transmission for reverse drive.

The starting clutch 5 controls transmission of power from the countershaft 2 to the output member. When the starting clutch 5 is engaged and the engaging force thereof is controlled, the size of the torque transmitted from the countershaft 2 to the output member is controlled. When the starting clutch 5 is engaged, output power from the engine ENG is transmitted at a speed ratio determined by the metallic V-belt mechanism 10 from the countershaft 2 through meshing gears 6a, 6b, 7a and 7b to the differential mechanism 8. It is then divided and transmitted to the right and left wheels (not shown in the figure). When the starting clutch 5 is disengaged, the torque transmission ratio is zero. Engine output power is not transmitted at all when the transmission is in this neutral condition. This operation of the starting clutch 5 is manipulated by a clutch control valve 75 in response to control signals sent from a controller 70. The clutch control valve 75 regulates the hydraulic pressure (starting clutch control pressure $P_{SC}$) supplied to the starting clutch 5 through passages 31a and 31b, and controls the operation thereof. The construction of the clutch control valve 75 will be described in detail later.

The controller 70 receives electric signals corresponding to the engine rotational speed Ne and the engine intake vacuum pressure PB from an engine control unit ECU, which controls the operation of the engine ENG. In addition to these signals, it also receives a detection signal from an air-conditioner sensor 76, which detects whether the air-conditioner AC is operating or not, and a shift-range position signal from a shift-range detector 77, which detects the shift-range based on the position of the shift lever ATP.

Figure 2:
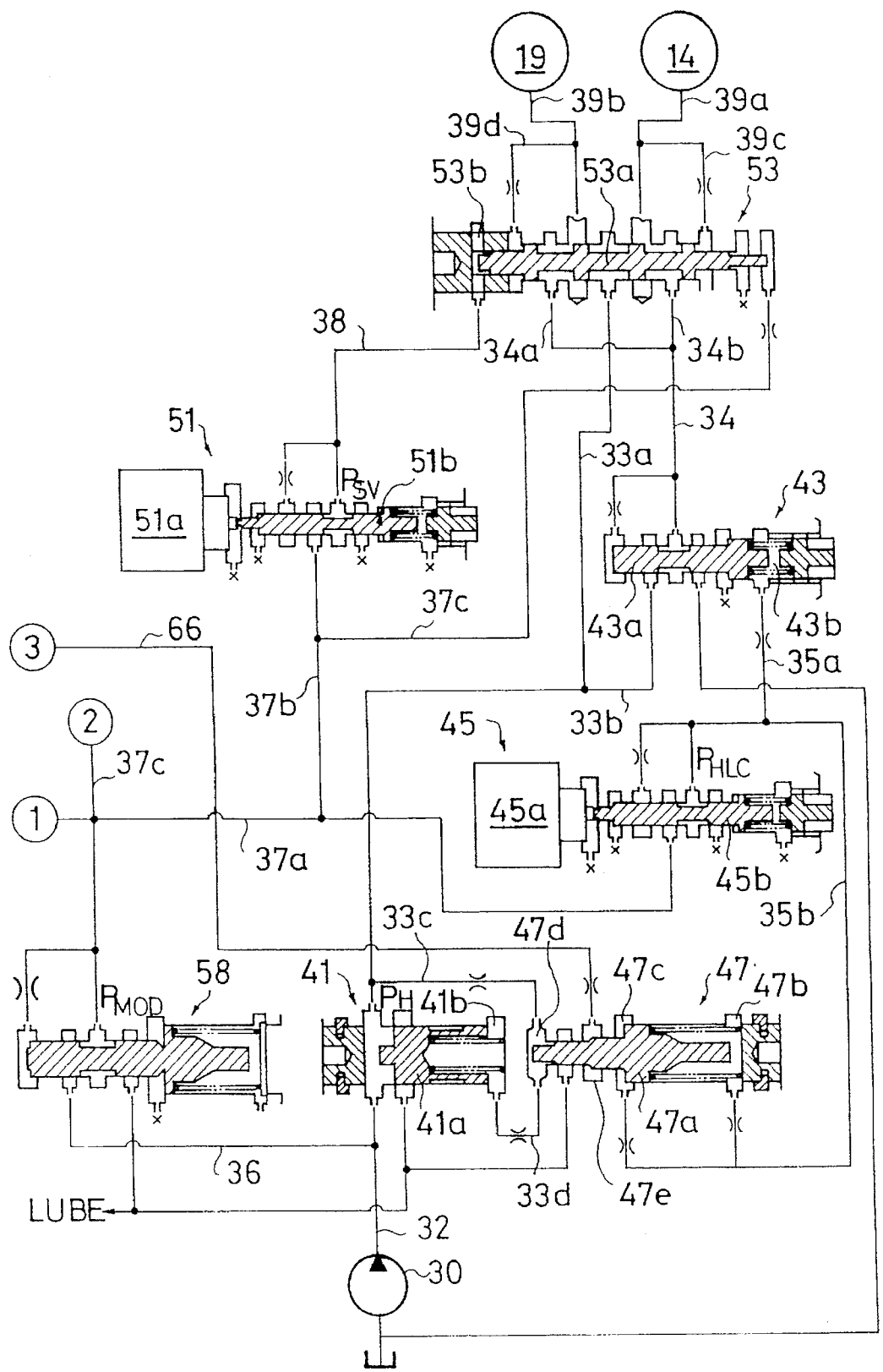
FIG. 2 is a hydraulic circuit diagram of a portion of the pulley thrust pressure control apparatus.

The hydraulic pressures (the pulley thrust pressures) supplied into the drive and driven cylinder chambers 14 and 19 are controlled by a pulley thrust pressure valve unit 40 and a shift control valve unit 50 in response to control signals received from the controller 70. As shown in FIG. 2, the pulley thrust pressure valve unit 40 comprises a high pressure regulator valve 41, a low pressure regulator valve 43, a high/low pressure control valve 45, and a high pressure control valve 47. The shift control valve unit 50 comprises a shift control valve 51 and a shift valve 53. The constructions of these valves will be described in detail in the following description of the control apparatus.

Figure 3:
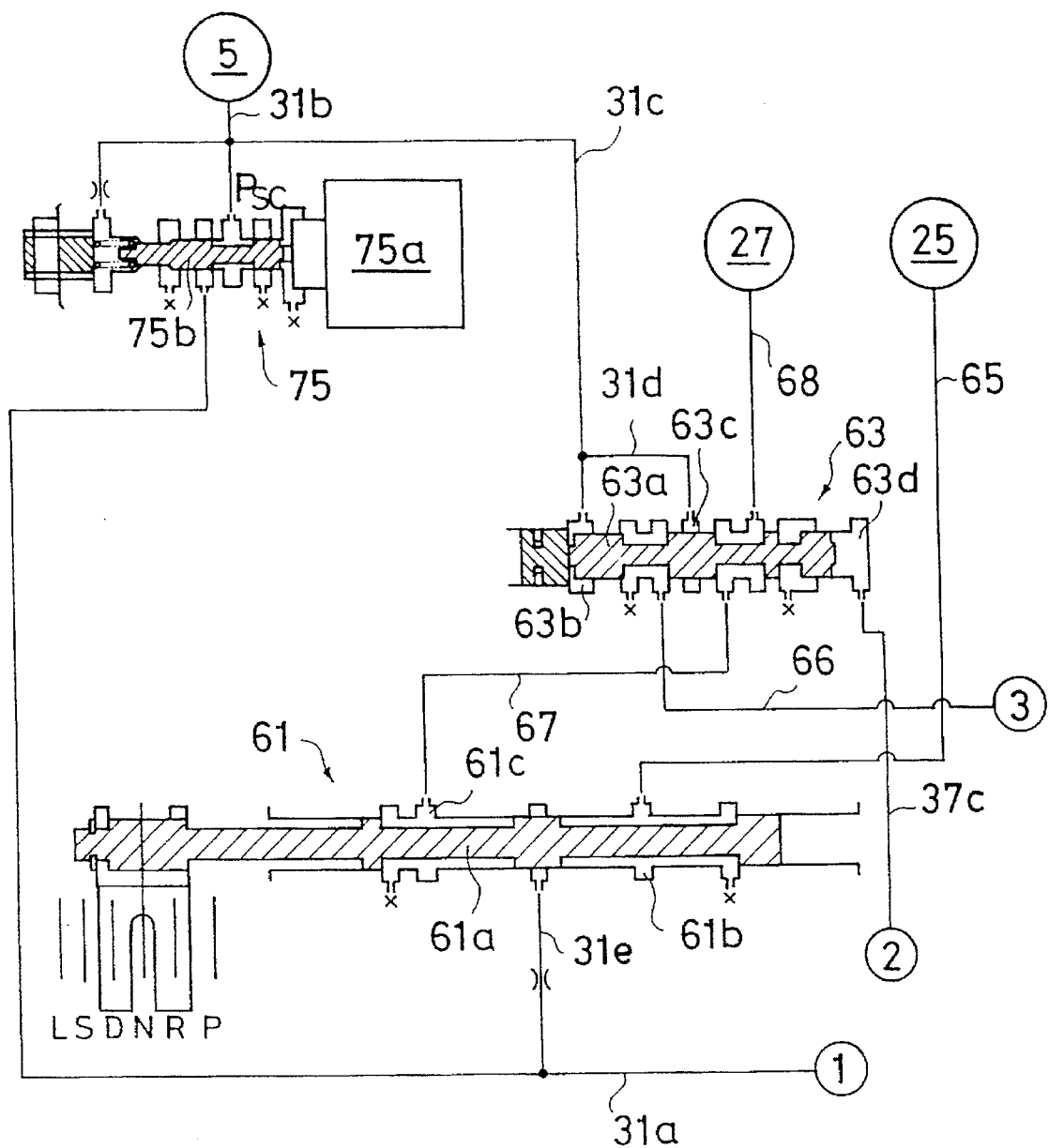
FIG. 3 is a hydraulic circuit diagram of a portion of the pulley thrust pressure control apparatus.

The hydraulic circuit arrangements shown in FIGS. 2 and 3 integrally make up a single hydraulic circuit when the ends of passages marked (1), (2), and (3) in FIGS. 2 and 3 are interconnected. The mark "X" in the figures indicates a connection point to the drainage of the circuit.

Oil from a hydraulic pump 30 is supplied through a hydraulic passage 32 to the above mentioned high pressure regulator valve 41. It is also supplied through a hydraulic passage 36 to a reducing valve 58 to generate a line pressure $P_{MOD}$, which has a substantially constant pressure. The line pressure $P_{MOD}$ is then supplied to the above mentioned high/low pressure control valve 45, shift control valve 51, clutch control valve 75, and a manual valve 61 through passages 37a, 37b, 31a, and 31e.

The high/low pressure control valve 45 includes a linear solenoid 45a. Control of the energizing current to the linear solenoid 45a enables control of the biasing force applied on the spool 45b. In correspondence with the biasing force applied on the spool, the high/low pressure control valve 45 converts or adjusts the line pressure $P_{MOD}$ supplied through the passage 37a to a control back-pressure $P_{HLC}$. The control back-pressure $P_{HLC}$ produced is then supplied through a passage 35a into the right-end chamber 43b of the low pressure regulator valve 43 so as to push the spool 43a thereof to the left. The control back-pressure $P_{HLC}$ is also supplied through a passage 35b into the right-end chamber 47b of the high pressure control valve 47 and the first halfway chamber 47c next from the right end. The control back-pressure $P_{HLC}$ in the right-end chamber 47b pushes the spool 47a to the left, and the control back-pressure $P_{HLC}$ in the first halfway chamber 47c pushes the spool 47a to the right.

The high pressure regulator valve 41 converts or adjusts the pressure of oil supplied through the passage 32 from the pump 30, to a high pulley thrust control pressure PH. The high pulley thrust control pressure PH generated here is then supplied to the shift valve 53 through a passage 33a and also to the low pressure regulator valve 43 through a passage 33b. Furthermore, the high pulley thrust control pressure PH is supplied to a passage 33c which branches from the passage 33a and connects to the left-end chamber 47d of the high pressure control valve 47.

The second halfway chamber 47e of the high pressure control valve 47 is connected through a passage 66 to a reverse inhibitor valve 63. As such, the spool 47a of the high pressure control valve 47 is positionally controlled by the control back-pressure $P_{HLC}$ received in the right-end chamber 47b and first halfway chamber 47c through the passage 35b and a second starting clutch control pressure $P_{SC}2$, which will be described later, received in the second halfway chamber 47e through the passage 66. This positional control of the spool 47a enables the high pressure control valve 47 to adjust the high pulley thrust control pressure PH received through the passage 33c to a pressure which is supplied into the right-end chamber 41b of the high pressure regulator valve 41 as back pressure.

The low pressure regulator valve 43 converts or adjusts the high pulley thrust control pressure PH supplied through the passage 33b to a low pulley thrust control pressure PL in correspondence with the control back-pressure $P_{HLC}$. The low pulley thrust control pressure PL is then supplied to the shift valve 53 through a passage 34 and passages 34a and 34b, which are branched from the passage 34.

Figure 5:
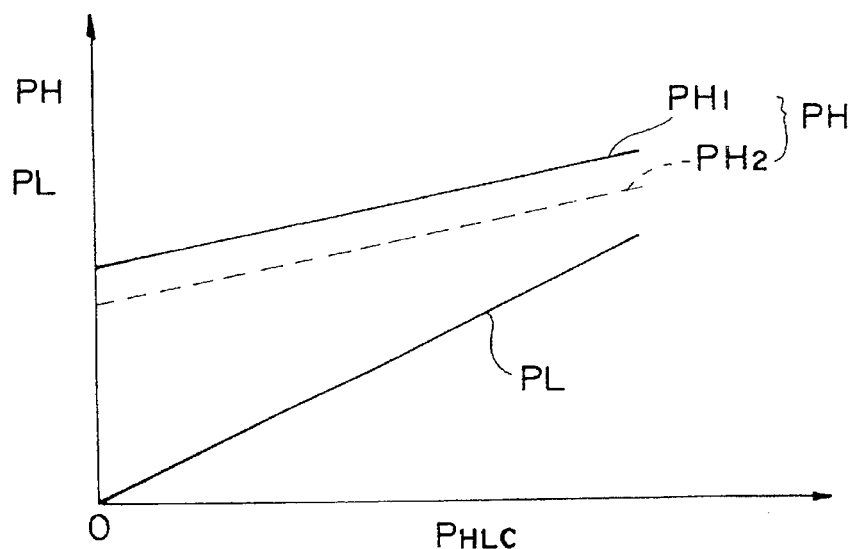
FIG. 5 is a graph showing high and low pulley thrust control pressures set by the pulley thrust pressure control apparatus.

FIG. 5 shows the relationship between the control back-pressure $P_{HLC}$, which is produced by the high/low pressure control valve 45, and the high and low pulley thrust control pressures PH and PL, which are set by the high pressure regulator valve 41, high pressure control valve 47, and low pressure regulator valve 43. The high pulley thrust control pressure PH is switched between two pressures PH1 and PH2. How this switching is carried out will be discussed later. The first pulley thrust control pressure PH1 shown by the solid line in the graph is selected while the vehicle is starting because control of the speed ratio is most required during the start. The second pulley thrust control pressure PH2 (<PH1) shown by the dotted line is selected during normal drive (but only in forward drive as explained later), when a change of the speed ratio is less frequent. The low pulley thrust control pressure PL is the minimum pressure, when applied to the pulleys, which keeps the belt running without slippage.

The shift control valve (positional control biasing means) 51 includes a linear solenoid 51a. Control of the energizing current through the linear solenoid 51a makes the biasing force applied to the spool 51b controllable. As such, the line pressure $P_{MOD}$ supplied through the passage 37b to the shift control valve 51 is adjusted to a shift control pressure $P_{SV}$ in correspondence with the biasing force. Then, the shift control pressure $P_{SV}$ is supplied into the left-end chamber 53b of the shift valve 53 through a passage 38 so as to push the spool 53a of the shift valve 53 to the right.

Figure 4:
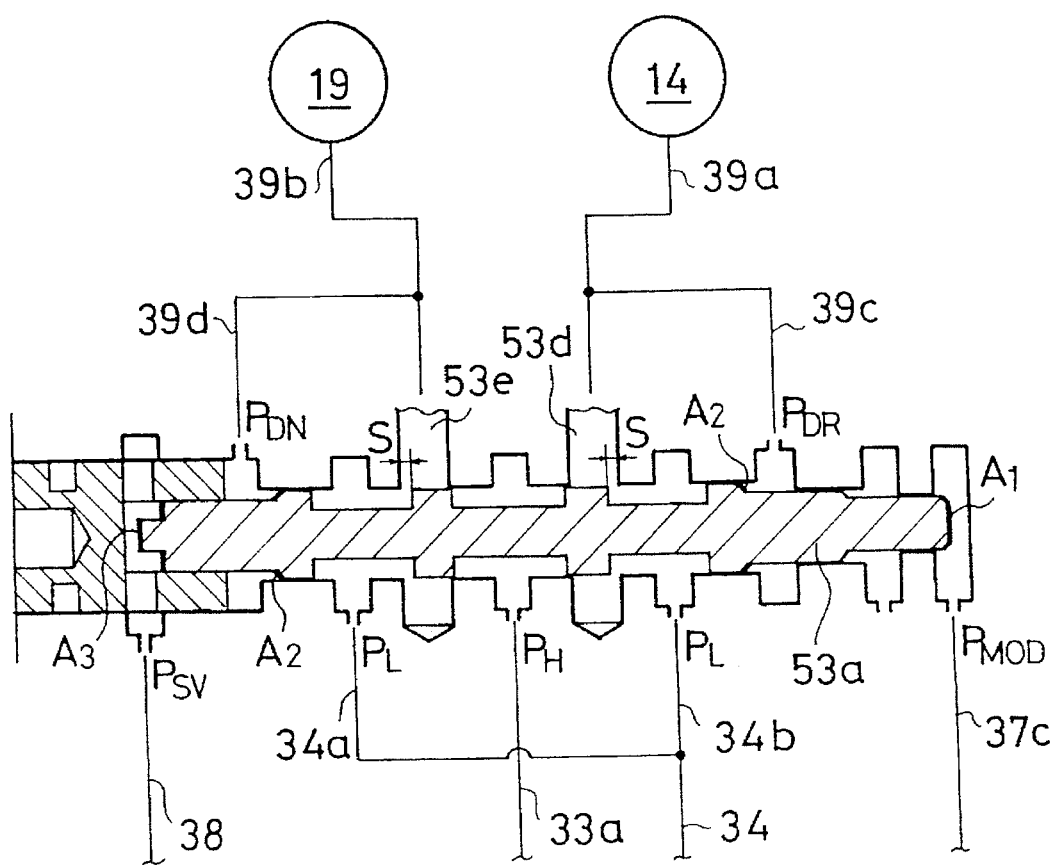
FIG. 4 is an enlarged view of a shift valve used in the pulley thrust pressure control apparatus.

The shift valve 53 controls the delivery of the high and low pulley thrust control pressures PH and PL selectively into the drive and driven cylinder chambers 14 and 19 through the passages 39a and 39b, corresponding to the position of the spool 53a. As shown in FIG. 4, the left end surface (pressure-receiving area A3) of the spool 53a receives the shift control pressure (first positional control force) $P_{SV}$, which pushes the spool 53a to the right. On the other hand, the right end surface (pressure-receiving area A1) of the spool 53a receives the line pressure $P_{MOD}$ supplied through the passage 37c, which is branched from the passage 37b, so the spool 53a is pushed to the left. Furthermore, the right-side mediate surface (pressure-receiving area A2) of the spool 53a receives the inside pressure of the drive cylinder chamber 14, i.e, drive pulley thrust pressure (second positional control force) $P_{DR}$ through a drive pressure feedback passage 39c, which is branched from the passage 39a, and the spool 53a is pushed to the left. Moreover, the left-side mediate surface (pressure-receiving area A2) of the spool 53a receives the inside pressure of the driven cylinder chamber 19, i.e. driven pulley thrust pressure (third positional control force) $P_{DN}$ through a driven pressure feedback passage 39d, which is branched from the passage 39b, and the spool 53a is pushed to the right. As a result, the spool 53a is shifted to the position where the force pushing the spool 53a to the left, i.e., $P_{MOD} \times A1 + P_{DR} \times A2$, balances with the force pushing it to the right, i.e., $P_{SV} \times A3 + P_{DN} \times A2$.

Here, an equation is given to describe the condition where both forces are balanced.

$$P_{MOD} \times A1 + P_{DR} \times A2 = P_{SV} \times A3 + P_{DN} \times A2. \quad (1)$$

Being modified, $$P_{MOD} \times A1 + (P_{DR} - P_{DN}) \times A2 = P_{SV} \times A3. \quad (2)$$

Figure 6:
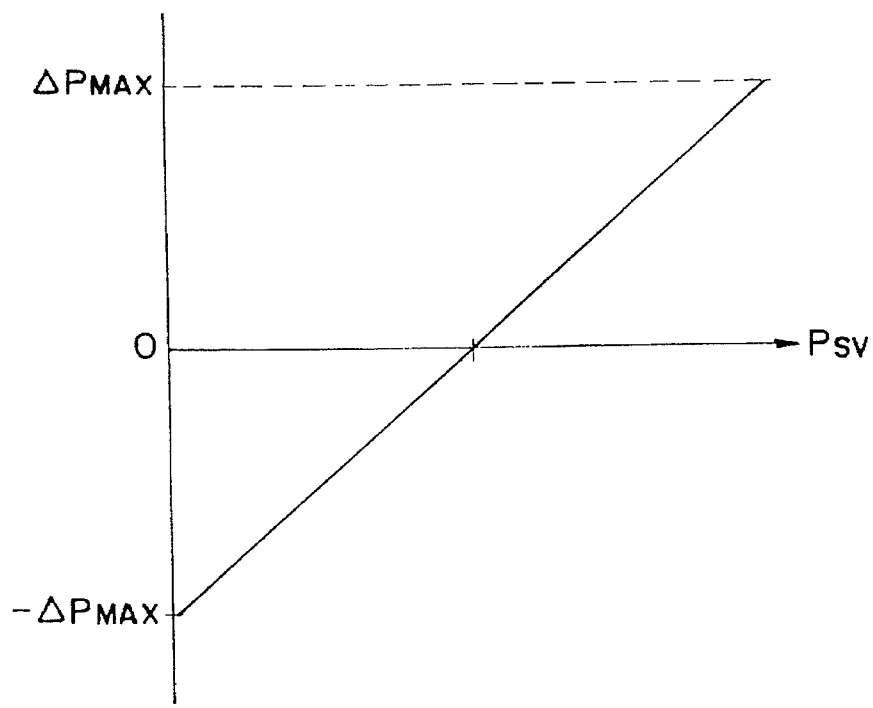
FIG. 6 is a graph showing the pressure difference between pressures discharged by the shift valve.

As seen from the equation (2) and FIG. 6, the difference between the drive pulley thrust pressure $P_{DR}$ and driven pulley thrust pressure $P_{DN}$, i.e., $\Delta P = P_{DR} - P_{DN}$, is proportional to the shift control pressure $P_{SV}$. Therefore, if either of the drive pulley thrust pressure $P_{DR}$ or the driven pulley thrust pressure $P_{DN}$ is set at the low pulley thrust control pressure PL, then the other can be set at a pressure which is the low pulley thrust control pressure PL plus a pressure increased proportionally to the shift control pressure $P_{SV}$.

The clutch control valve 75 has a linear solenoid 75a. Control of the energizing current to the linear solenoid 75a enables control of the biasing force working on the spool 75b. In correspondence with the biasing force so controlled, the line pressure $P_{MOD}$ supplied through the passage 31a is adjusted to generate the previously mentioned starting clutch control pressure $P_{SC}$, which is discharged to the passage 31b and to a hydraulic passage 31c, which is branched from the passage 31b. The passage 31b is connected to the starting clutch 5, and the starting clutch control pressure $P_{SC}$ controls the engagement of the starting clutch 5. The passages 31c and 31d lead the starting clutch control pressure $P_{SC}$ into the left-end chamber 63b and the first halfway chamber 63c of the reverse inhibitor valve 63, respectively.

Figure 7:
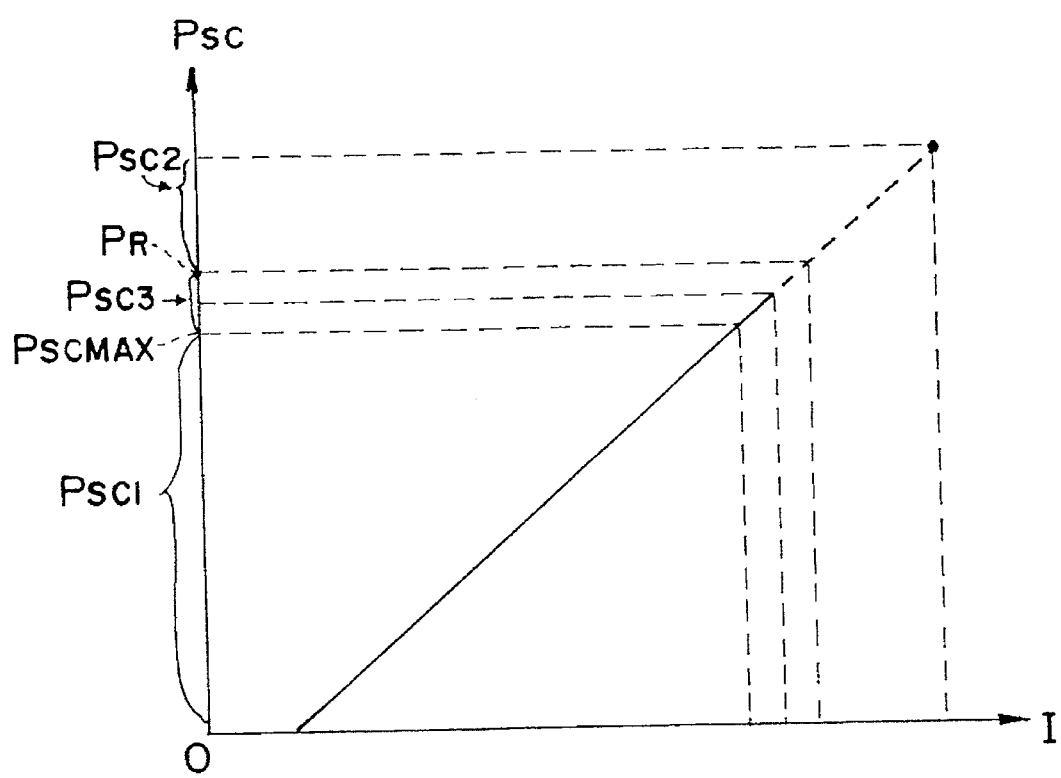
FIG. 7 is a graph showing clutch control pressures generated by the clutch control valve used in the control unit of the V-belt-type continuously variable transmission.

Now, as shown in FIG. 7, the starting clutch control pressure $P_{SC}$ generated from the clutch control valve 75 is proportional to the energizing current I provided to the linear solenoid 75a. For the purpose of applying the starting clutch control pressure $P_{SC}$ as a signal to initiate different functions in the system, a categorization is made so as to assign three pressure ranges to the starting clutch control pressure $P_{SC}$: a first starting clutch control pressure $P_{SC}1$, which ranges from zero to a maximum clutch torque control pressure $P_{SC}MAX$ for controlling the torque transmission ratio of the starting clutch 5; a second starting clutch control pressure $P_{SC}2$, which occupies the range greater than an actuation-initiating pressure PR ($>P_{SC}MAX$) which is greater than the maximum clutch torque control pressure $P_{SC}MAX$ and initiates the actuation of the reverse inhibitor valve 63; and a third starting clutch control pressure $P_{SC}3$, which occupies the range greater than $P_{SC}MAX$ but smaller than the actuation-initiating pressure PR. The first starting clutch control pressure $P_{SC}1$ is used for controlling the engagement of the starting clutch 5, and the torque transmission ratio of the starting clutch 5 in engagement is controlled in correspondence with the magnitude of the first starting clutch control pressure $P_{SC}1$. The torque transmission ratio of the starting clutch 5 is set in such a way that when the starting clutch 5 receives the first starting clutch control pressure $P_{SC}1$ reaching the maximum clutch torque control pressure $P_{SC}MAX$, a maximum torque input on the input side is transmitted fully to the output side without slippage.

The second starting clutch control pressure $P_{SC}2$ is used for fixing the torque transmission ratio of the starting clutch 5 to the maximum and for controlling the actuation of the reverse inhibitor valve 63. The third starting clutch control pressure $P_{SC}3$ is used only for fixing the torque transmission ratio of the starting clutch 5 to the maximum. As such, the first starting clutch control pressure $P_{SC}1$ is applied when the vehicle is starting. The second starting clutch control pressure $P_{SC}2$ is applied when the vehicle is in a smooth forward drive, and the third starting clutch control pressure $P_{SC}3$ is applied when the vehicle is in a smooth but reverse drive.

The manual valve 61 is connected to a shift lever provided at the driver's seat (not shown) with a cable. When the shift lever is operated manually by the driver to one of the six positions P, R, N, D, S, and L, the spool 61 a of the manual valve 61 is shifted correspondingly to one of the positions indicated in FIG. 3, which is showing the spool 61 a at the N (neutral) position. The first halfway chamber 61b provided in the right portion of the manual valve 61 is connected to the forward clutch 25 through a passage 65, and the second halfway camber 61c provided in the left portion is connected to the reverse inhibitor valve 63 through a passage 67. This passage 67 is connected through the reverse inhibitor valve 63 to a passage 68 which is connected to the reverse brake 27.

When the spool 61 a of the manual valve 61 is at the P or N position, the passages 65 and 67 are connected to the drain. As a result, both forward clutch 25 and reverse brake 27 are not actuated for engagement. When the spool 61a is at the D, S, or L position, the passage 67 is connected to the drain, and the passage 31e having the line pressure $P_{MOD}$ is connected with the passage 65. As a result, the reverse brake 27 is not actuated, but the forward clutch 25 is actuated for engagement. Furthermore, when the spool 61a is at the R position, the passage 65 is connected to the drain, and the passage 31e having the line pressure $P_{MOD}$ is connected with the passage 67. As a result, the forward clutch 25 is not actuated for engagement, but the reverse brake 27 is actuated either for engagement or disengagement in relation with the operation of the reverse inhibitor valve 63, which will be described next.

The line pressure $P_{MOD}$ is supplied into the right-end chamber 63d of the reverse inhibitor valve 63 through the passage 37c to push the spool 63a to the left. When the first starting clutch control pressure $P_{SC}1$ or third starting clutch control pressure $P_{SC}3$ is supplied into the left-end chamber 63b of the reverse inhibitor valve 63 in connection with the vehicle's starting or reversing, the spool 63a is positioned at the left stroke end, and the passages 67 and 68 are connected to each other. Therefore, when the spool 61a of the manual valve 61 is at the R position, i.e., the passages 31e and 67 are connected with each other, the reverse brake 27 is actuated for engagement. Furthermore, when the spool 63a of the reverse inhibitor valve 63 is positioned at the left stoke end, the passage 66 which is connected from the reverse inhibitor valve 63 to the second halfway chamber 47e of the high pressure control valve 47 is connected to the drain.

On the other hand, when the second starting clutch control pressure $P_{SC}2$ is supplied into the left-end chamber 63b of the reverse inhibitor valve 63 in connection with the vehicle's smooth forward drive, the spool 63a is positioned at the right stroke end. As a result, fluid communication of the passages 67 and 68 is blocked, and the passage 68 is connected to the drain. In this condition, even if the spool 61a of the manual valve 61 is mistakenly shifted to the "R" position, the reverse brake 27 will not actuate for engagement, thereby insuring the avoidance of switching to reverse-drive transmission mode while driving forward.

Moreover, when the spool 63a is at the right stroke end, the passages 66 and 31d are connected with each other, and the second starting clutch control pressure $P_{SC}2$ is supplied into the second halfway chamber 47e of the high pressure control valve 47. As a result, the thrust working on the spool 47a rightward is increased, thereby, in turn, reducing the back pressure supplied into the right-end chamber 41b of the high pressure regulator valve 41. As a result, the high pulley thrust control pressure PH generated by the high pressure regulator valve 41 is switched from the first high pulley thrust control pressure PH1, which is generated to meet the need of frequent speed ratio control while the vehicle is starting, to the second high pulley thrust control pressure PH2, which is generated at a pressure substantially smaller than the first high pulley thrust control pressure PH1, only to satisfy the need of less frequent speed ratio control while the vehicle is in smooth forward drive. As a result, the load of the oil pump 30 is reduced corresponding to this pressure reduction, whereby the fuel efficiency is improved as the engine runs with less of a load.

With the control system, which is constructed as described above, the vehicle is capable of driving while the starting clutch 5 and the forward clutch 25 or the reverse brake 27 are engaged. In addition, with the spool 53a of the shift valve 53 positionally controlled through control of the shift control pressure $P_{SV}$, the pressures supplied into the cylinder chambers 14 and 19 are controlled, in turn, to control the speed ratio of the transmission.

As shown in FIG. 4, when the spool 53a of the shift valve 53 is positioned at a neutral position, the passages 34a and 34b are connected with the passages 39a and 39b respectively through the openings (flow ways) S which exist because of the underlap of the land portions of the spool 53a and the drive and driven ports 53d and 53e. In this condition, change control of the speed ratio is not carried out, and both the drive and driven cylinder chambers 14 and 19 are supplied with the low pulley thrust control pressure PL, whereby the minimum pressure necessary for enabling torque transmission without any slippage in the belt 15 is set.

However, when the spool 53a is, for example, shifted a little to the right in the vicinity of the neutral position, the opening S on the right hand side in the figure almost disappears, and the flow of oil from the passage 34b to the passage 39a is reduced, causing a shortage. In this condition, there is a concern that the pressure in the drive cylinder chamber 14, i.e., drive pulley thrust pressure $P_{DR}$ would become smaller than the low pulley thrust control pressure PL before the high pulley thrust control pressure PH is supplied into the drive cylinder chamber 14, and the reduced pressure would cause slippage of the belt 15 over the drive pulley 11. With the control apparatus of the present invention, this does not happen. When the drive pulley thrust pressure $P_{DR}$ becomes smaller than the low pulley thrust control pressure PL even by a minute amount, the pressure working on the right-side mediate surface A2 of the spool 53a through the drive pressure feedback passage 39c also decreases a little. As a result, the spool 53a is shifted further from the vicinity of the neutral position to the right, and the passage 33a is quickly connected with the passage 39a.

Now, the high pulley thrust control pressure PH is supplied into the drive cylinder chamber 14, and the drive pulley thrust pressure $P_{DR}$ increases to a pressure greater than the low pulley thrust control pressure PL. In this way, the force from the hydraulic pressure working over the right-side mediate surface A2 through the feedback passage 39c (second positional control force) works not to let the drive pulley thrust pressure $P_{DR}$ become less than the low pulley thrust control pressure PL. In other words, as seen from FIG. 8, the low pulley thrust control pressure PL is insured to be the minimum pressure of the drive pulley thrust pressure $P_{DR}$ even when the spool 53a is positioned in the vicinity of the neutral position, whereby slippage of the belt 15 on the drive pulley 11 is avoided. Moreover, when the spool 53a is shifted to the right beyond the vicinity of the neutral position, the supply of the high pulley thrust control pressure PH is initiated into the drive cylinder chamber 14. In the same way, the low pulley thrust control pressure PL is insured to be the minimum pressure of the driven thrust pressure $P_{DN}$ even when the spool 53a is shifted a little from the neutral position to the left.

In this way, a smooth control of pressure supply is carried out, for example, even if either pressure of the cylinder chambers 14 and 19 has to be increased to a pressure greater than the low pulley thrust control pressure PL by shifting the spool 53a a little to the right or left from the neutral position in order to prevent a change of the speed ratio caused by a change in the torque transmitted through the belt 15, i.e., to keep the speed ratio at a constant.

For example, after the spool 53a is shifted to the neutral position by setting the shift control pressure $P_{SV}$ appropriately, the drive pulley thrust pressure $P_{DR}$ may happen to decrease to a pressure smaller than the low pulley thrust control pressure PL due to the inertia of the movable pulley members 13 and 18, which have been shifting for adjusting the variable pulley widths, or due to a change in the torque transmitted through the belt 15. When this happens, the spool 53a of the shift valve 53 shifts to the right to the position where this reduced drive pulley thrust pressure $P_{DR}$ supplied through the drive pressure feedback passage 39c balances with the other pressures. As a result, the passage 33a is connected with the passage 39a, and the drive pulley thrust pressure $P_{DR}$, once decreased, is immediately increased to the low pulley thrust control pressure PL.

As such, if the shift control pressure $P_{SV}$ is set so as to position the spool 53a at the neutral position, then the spool 53a will shift by itself to correct such pressure change when it happens in both cylinder chambers 14 and 19. Therefore, control of the shift control pressure $P_{SV}$ is simple. In the same way, if the pressure inside the driven cylinder chamber 19 happens decrease to a pressure less than the low pulley thrust control pressure PL, it is corrected by itself.

Figure 8:
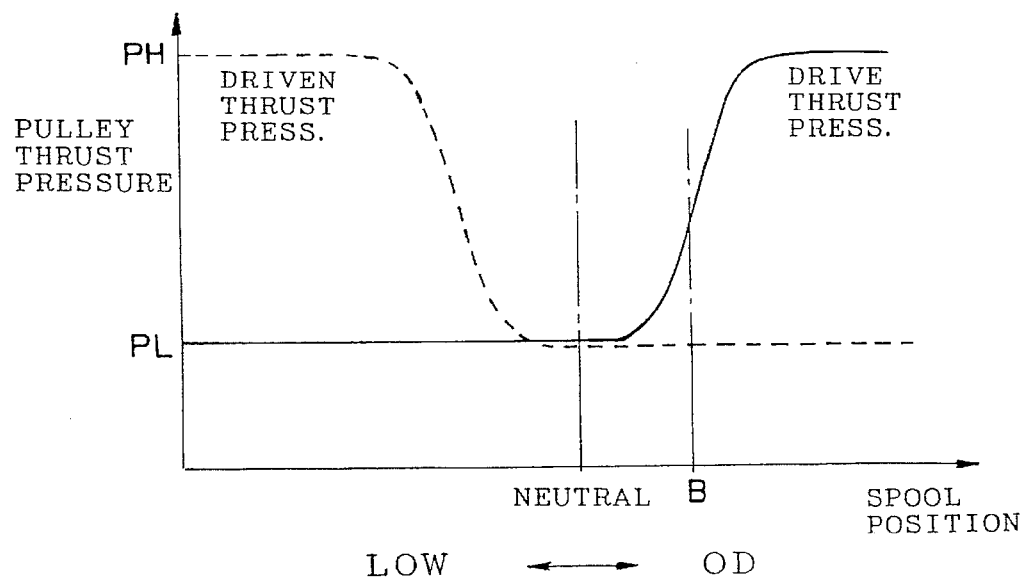
FIG. 8 is a graph showing pressures discharged from the shift valve.
Figure 10:
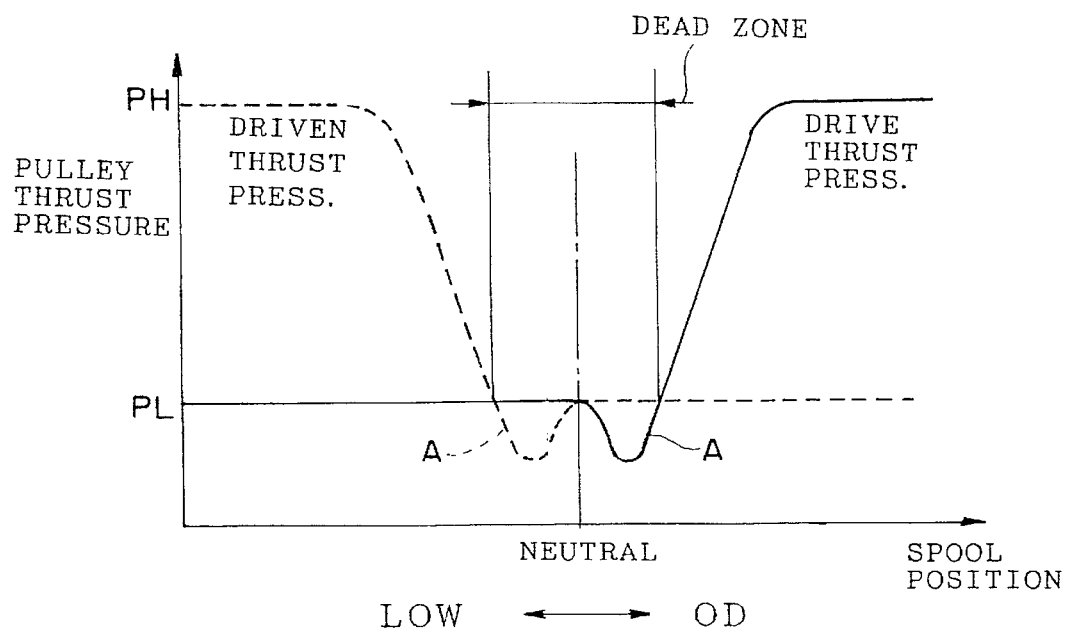
FIG. 10 is a graph showing pressures discharged from the shift valve of the prior art.
Figure 9:
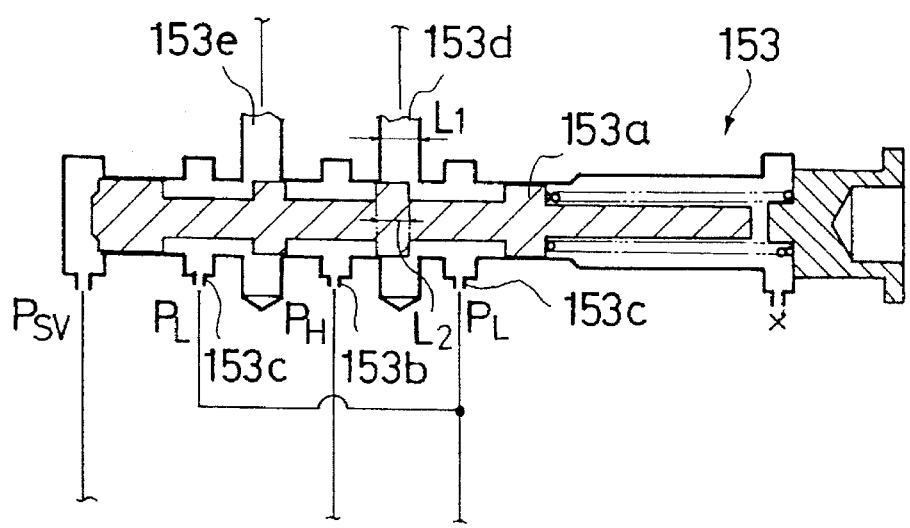
FIG. 9 is a schematic view of a shift valve of the prior art.
Figure 11:
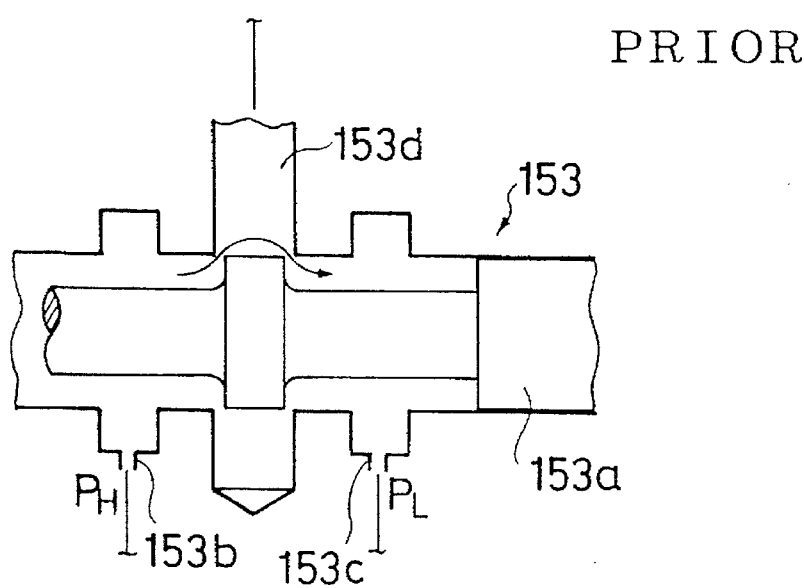
FIG. 11 is an enlarged view of a portion of the shift valve of the prior art.

For example, when the spool 53a is shifted to the position marked by the "B" in FIG. 8, which is a position little further to the right than the above mentioned vicinity of the neutral position, where the drive pulley thrust pressure $P_{DR}$ is less than the high pulley thrust control pressure PH[PH1], by increasing the shift control pressure $P_{SV}$, and if the drive pulley thrust pressure $P_{DR}$ decreases, then the spool 53a shifts from the position "B" to the right, to the position where this reduced drive pulley thrust pressure $P_{DR}$ balances with the other pressures, increasing the cross-sectional area of the connection from the passage 33a to the passage 39a. As a result, the drive pulley thrust pressure $P_{DR}$ increases in correspondence with the increased flow through the connection, regaining the original drive pulley thrust pressure $P_{DR}$. In this way, even when the spool 53a is positioned at a location other than at the neutral position, changes in the pressures inside both cylinder chambers 14 and 19 are corrected by themselves. Therefore, positional control of the spool 53a does not require any sophisticated control with high precision.

In the above embodiment, a hydraulic pressure (shift control pressure $P_{SV}$) is supplied into the left-end chamber of the shift valve 53 as the positional control force. However, instead of applying this hydraulic pressure, a solenoid may be substituted to provide the necessary thrust directly to the spool. Also, in the above embodiment, a hydraulic pressure (line pressure) is supplied into the right-end chamber of the shift valve 53. Instead of applying this hydraulic pressure, a spring may be substituted to provide necessary thrust.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pulley thrust pressure control apparatus for a belt-type continuously variable transmission having a drive pulley connected with an input member, a driven pulley connected with an output member, a V-belt trained around said drive and driven pulleys, a drive cylinder for varying the pulley width of said drive pulley, and a driven cylinder for varying the pulley width of said driven pulley, comprising:

thrust pressure setting means for setting a low pulley thrust control pressure and a high pulley thrust control pressure which is greater than said low pulley thrust control pressure;

a shift valve having a shifting spool; said shift valve supplying said low and high pulley thrust control pressures selectively into said drive and driven cylinders in correspondence with the position of said shifting spool;

positional control biasing means for providing said shifting spool with a first positional control force for the purpose of controlling the position of said shifting spool;

a drive pressure feedback passage connected to said drive cylinder for causing the pressure inside said drive cylinder to act on said shifting spool as a second positional control force; and a driven pressure feedback passage connected to said driven cylinder for causing the pressure inside said driven cylinder to act as a third positional control force on said shifting spool in a direction opposite of said second positional control force.

2. The pulley thrust pressure control apparatus as set forth in claim 1 wherein:

said shifting spool is positionally controlled by said first, second and third positional control forces; and while said first, second, and third positional control forces are in balance, if the pressure from one of the drive and driven pressure feedback passages decreases, then a resulting unbalance of said first, second and third positional control forces creates a positional control force which shifts said shifting spool, whereby said high pulley thrust control pressure is supplied into the cylinder connected to said one of the drive and driven pressure feedback passages whose pressure has decreased.

3. The pulley thrust pressure control apparatus as set forth in claim 1 wherein:

when said shifting spool is shifted in the direction of said second positional control force, said shift valve supplies said low pulley thrust control pressure into said drive cylinder and said high pulley thrust control pressure into said driven cylinder; and when said shifting spool is shifted in the direction of said third positional control force, said shift valve supplies said low pulley thrust control pressure into said driven cylinder and said high pulley thrust control pressure into said drive cylinder.

4. The pulley thrust pressure control apparatus as set forth in claim 3 wherein:

said shifting spool is positionally controlled by said first, second and third positional control forces; and while said first, second, and third positional control forces are in balance, if the pressure from one of the drive and driven pressure feedback passages decreases, then a resulting unbalance of said first, second and third positional control forces creates a positional control force which shifts said shifting spool, whereby said high pulley thrust control pressure is supplied into the cylinder connected to said one of the drive and driven pressure feedback passages whose pressure has decreased.

5. The pulley thrust pressure control apparatus as set forth in claim 1 wherein said thrust pressure setting means includes a high pressure regulator valve for producing said high pulley thrust control pressure and a low pressure regulator valve for producing said low pulley thrust control pressure.

6. The pulley thrust pressure control apparatus as set forth in claim 5 wherein:

said thrust pressure setting means further includes a high/low pressure control valve for producing a control back pressure in correspondence with an electromagnetic force; and said control back pressure is supplied to said high pressure regulator valve and low pressure regulator valve so as to control pressure adjustment thereof, whereby said high and low pulley thrust control pressures are adjusted to keep a predetermined relation therebetween.

7. The pulley thrust pressure control apparatus as set forth in claim 1 wherein:

said shifting spool receives a constant line pressure on one end thereof and a shift control pressure provided by a shift control valve on the other end, said constant line pressure and said shift control pressure together working as said first positional control force; and said shift control valve comprises an electromagnetic regulator valve whose energizing current is controlled so as to control said shift control pressure, whereby said first positional control force is controlled.

8. The pulley thrust pressure control apparatus as set forth in claim 1 wherein:

when said shifting spool is at a neutral position in said shift valve, said low pulley thrust control pressure is supplied into said drive and driven cylinders through openings present due to underlap of land portions of said shifting spool and valve ports in a body of said shift valve; and when said shifting spool is shifted either to the right or to the left from the neutral position, said low pulley thrust control pressure is continually supplied into one of said drive and driven cylinders and said high pulley thrust control pressure is supplied into the other of said drive and driven cylinders, through said openings present due to underlap of said land portions that have been shifted and said valve ports.

9. The pulley thrust pressure control apparatus as set forth in claim 8 wherein:

while said shifting spool is being shifted either to the right or to the left from the neutral position and the supply of said high pulley thrust pressure is being initiated, the opening connecting said other cylinder to a supply port of said low pulley thrust control pressure becomes smaller, and then the opening connecting said other cylinder to a supply port of said high pulley thrust control pressure becomes gradually larger.

10. A pulley thrust pressure control apparatus for a belt-type continuously variable transmission having a drive pulley connected with an input member, a driven pulley connected with an output member, a V-belt trained around said drive and driven pulleys a drive cylinders for varying the pulley width of said drive pulley, a driven cylinder for varying the pulley width of said driven pulley, and thrust pressure setting means for setting a low pulley thrust control pressure and a high pulley thrust control pressure which is greater than said low pulley thrust control pressure, comprising:

a shift valve having a shifting spool axially movable within a valve body; said shift valve supplying said low and high pulley thrust control pressures selectively into said drive and driven cylinders in correspondence with the axial position of said shifting spool in said valve body;

positional control biasing means for selectively shifting said shifting spool in said valve body; and means for continually urging said shifting spool toward a neutral axial position imposed by said positional control biasing means including separate and opposed first and second pressure receiving surfaces on said shifting spool, separate first and second passages communicating said drive and driven cylinders, respectively, said first and second pressure receiving surfaces, and cooperating means on said shifting spool and valve body for selectively supplying the high pulley thrust control pressure to said drive and driven cylinders upon movement of said shifting spool from said neutral axial position.

11. The pulley thrust pressure control apparatus as set forth in claim 10, wherein said first and second pressure receiving surfaces are on opposite ends of said shift spool and face in opposite directions.

12. The pulley thrust pressure control apparatus as set forth in claim 11, wherein said cooperating means includes first and second land portions on said shifting spool cooperating with first and second ports in said valve body for controlling the flow of the high pulley thrust control pressure through said first and second ports to said drive and driven cylinders, respectively.

13. The pulley thrust pressure control apparatus as set forth in claim 10 wherein said cooperating means includes first and second land portions on said shifting spool cooperating with first and second ports in said valve body for controlling the flow of the high pulley thrust control pressure through said first and second ports to said drive and driven cylinders, respectively.

14. The pulley thrust pressure control apparatus as set forth in claim 13, wherein said first and second land portions also cooperate with said first and second ports for controlling a supply of the low pulley thrust control pressure through said first and second ports to said drive and driven cylinders, respectively, and each said first and second land portion and each said first and second ports are of a size and spaced on said shift spool and said valve body for substantially preventing a flow of the high pulley thrust control pressure passed a said land portion and through a said port directly into the supply of the low pulley thrust control pressure within said valve body.

15. The pulley thrust pressure control apparatus as set forth in claim 12, wherein said first and second land portions also cooperate with said first and second ports for controlling a supply of the low pulley thrust control pressure through said first and second ports to said drive and driven cylinders, respectively, ad each said first and second land portion and each said first and second ports are of a size and spaced on said shift spool and said valve body for substantially preventing a flow of the high pulley thrust control pressure passed a said land portion and through a said port directly into the supply of the low pulley thrust control pressure within said valve body.

16. The pulley thrust pressure control apparatus as set forth in claim 10, wherein the low pulley thrust control pressure is maintained at a predetermined pressure during operation of said means for continually urging said shifting spool toward a neutral position when said shifting spool moves axially away from the neutral position and back to the neutral position.

17. The pulley thrust pressure control apparatus as set forth in claim 10, wherein the pressure in said drive and driven cylinders are maintained at a predetermined pressure during operation of said means for continually urging said shifting spool toward a neutral position when said shifting spool moves axially away from the neutral position and back to the neutral position.

* * * * *

UNITED STATES PATENT AND TRADEMARK OFFICE
CERTIFICATE OF CORRECTION

PATENT NO. : 5,649,876
DATED : July 22, 1997
INVENTOR(S) : N. Morishita

Page 1 of 1

It is certified that error appears in the above-identified patent and that said Letters Patent is hereby corrected as shown below:

<u>Title page,</u>
Item [57], ABSTRACT,
Line 15, change "cause" to read -- caused --.

<u>Column 14,</u>
Line 18, after "cylinders" delete the comma ",".
Line 35, after "pulleys" insert a comma -- , --.

<u>Column 15,</u>
Line 22, after "pressure" delete "passed" and substitute -- past --.

<u>Column 16,</u>
Line 4, delete "ad" and substitute -- and --.
Line 8, after "pressure" delete "passed" and substitute -- past --.
Line 20, after "cylinders" delete "are" and insert -- is --.

Signed and Sealed this

Twenty-seventh Day of January, 2004

JON W. DUDAS
*Acting Director of the United States Patent and Trademark Office*